US008050627B2

(12) United States Patent
Makhlouf et al.

(10) Patent No.: US 8,050,627 B2
(45) Date of Patent: Nov. 1, 2011

(54) METHOD AND SYSTEM FOR PREDICTIVE SENSING OF PERIODIC INTERMITTENT INTERFERENCE

(75) Inventors: Isam R. Makhlouf, Lake Zurich, IL (US); Stephen P. Emeott, Rolling Meadows, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 539 days.

(21) Appl. No.: 11/611,725

(22) Filed: Dec. 15, 2006

(65) Prior Publication Data

US 2008/0146156 A1 Jun. 19, 2008

(51) Int. Cl.
*H04B 15/00* (2006.01)
(52) U.S. Cl. .................. 455/63.1; 455/67.13
(58) Field of Classification Search ............. 455/67.15, 455/63, 63.1, 67.13, 67.11, 501, 505, 506; 714/704; 375/224; 370/337, 319, 333, 311, 370/252, 347
See application file for complete search history.

(56) References Cited

U.S. PATENT DOCUMENTS

| | | | | |
|---|---|---|---|---|
| 5,574,979 | A * | 11/1996 | West | 455/63.1 |
| 6,006,071 | A * | 12/1999 | Roberts et al. | 455/63.1 |
| 6,256,478 | B1 * | 7/2001 | Allen et al. | 455/63.1 |
| 6,804,496 | B1 * | 10/2004 | Carlson et al. | 455/67.15 |
| 7,143,320 | B2 * | 11/2006 | Cavin | 714/704 |
| 2003/0126492 | A1 | 7/2003 | Cavin | |
| 2004/0203398 | A1 * | 10/2004 | Durrant | 455/63.1 |
| 2005/0058151 | A1 | 3/2005 | Yeh | |
| 2005/0159109 | A1 * | 7/2005 | Kivekas et al. | 455/67.11 |
| 2006/0014496 | A1 | 1/2006 | Klein | |
| 2006/0120333 | A1 * | 6/2006 | Horvat et al. | 370/337 |
| 2006/0133543 | A1 | 6/2006 | Linsky et al. | |
| 2006/0176827 | A1 | 8/2006 | Lehew et al. | |
| 2008/0144550 | A1 | 6/2008 | Makhlouf | |
| 2008/0146155 | A1 | 6/2008 | Makhlouf | |
| 2008/0146172 | A1 | 6/2008 | Makhlouf | |

FOREIGN PATENT DOCUMENTS

EP 0963051 12/1999

(Continued)

OTHER PUBLICATIONS

Allen Heberling "Draft Proposal for a Wireless Personal Area Network Medium Access Control and Physical Layer Protocol", Jan. 8, 1999, 1-16 pages. Doc.: IEEE 802.11-99/006.

(Continued)

*Primary Examiner* — Temesgh Ghebretinsae
*Assistant Examiner* — Gennadiy Tsvey

(57) ABSTRACT

A method (10 or 40) or system (200) of predictive sensing of periodic intermittent interference (PII) can include the measuring (12) of energy on a channel for an indication of PII, determining (14) if a channel is currently in a PII on-cycle, and adjusting (16) a clear channel assessment threshold to a new threshold for improved sensitivity of the PII on-cycle. If a current energy level on the channel is below the new threshold and if a previous on-energy characteristic suggests that the current energy level will remain below the new threshold for a predetermined minimum period of time, then a clear channel indication can be provided (20). A busy channel indication is provided (45) when either the current energy level is above the new threshold or the previous on-energy characteristic suggests the current energy level will not remain below the threshold for predetermined minimum period of time.

20 Claims, 3 Drawing Sheets

FOREIGN PATENT DOCUMENTS

| | | |
|---|---|---|
| EP | 1119153 A | 7/2001 |
| JP | 11136743 A | 5/1999 |
| WO | 9527381 A | 10/1995 |
| WO | 0173956 | 10/2001 |
| WO | 0165709 | 12/2001 |
| WO | 2004070988 A | 8/2004 |
| WO | 2005032053 | 4/2005 |

OTHER PUBLICATIONS

Tourrilhes J. Ed—Institute of Electrical and Electronics Engineers, "Fragment Adaptive Reduction; Coping with Various Interferers in Radio Unlicensed Bands", 2001 IEEE International Conference on Communications, Jun. 11-14, 2001, pp. 239-244, vol. 1 New York, New York, USA.

Patent Cooperation Treaty, "International Search Report and Written Opinion", ISA/EPUS, by Officer Dan Chimet, in PCT Application No. PCT/US2007/086571; Document of 22 pages dated May 29, 2008.

PCT Notification of Transmittal of the International Search Report and the Written Opinion of the International Searching Authority, or the Declaration, mailed May 20, 2008, pp. 1-11, PCT/US2007/086718, European Patent Office.

PCT Notification of Transmittal of the International Search Report and the Written Opinion of the International Searching Authority, of the Declaration, mailed May 29, 2008, pp. 1-14, PCT/US2007/086364, European Patent Office.

PCT, "Notification of Transmittal of the International Search Report and the Written Opinion of the International Searching Authority, or the Declaration", May 27, 2006, pp. 1-14, PCT/US2007/086443.

United States Patent and Trademark Office, "Non-Final Office Action Summary", .Aug. 5, 2010, pp. 1-25, U.S. Appl. No. 11/611,337.

United States Patent and Trademark Office, "Non-Final Office Action Summary", Oct. 15, 2009, pp. 1-13, U.S. Appl. No. 11/611,732.

United States Patent and Trademark Office, "Non-Final Office Action Summary", Aug. 21, 2009, pp. 1-10, U.S. Appl. No. 11/611,718.

The State Intellectual Property Office Of The People's Republic Of China "Notification of the First Office Action", Jun. 2, 2011, pp. 1-12, Chinese Pat. Appln. No. 200780046295.2.

European Patent Office, "Communication", Jul. 8, 2010, pp. 1-6, EPC Appln. No. 07869029.4.

* cited by examiner

METHOD AND SYSTEM FOR PREDICTIVE SENSING OF PERIODIC INTERMITTENT INTERFERENCE

RELATED APPLICATIONS

This application is related to Ser. No. 11/611,732 entitled METHOD AND SYSTEM for DETECTING PERIODIC INTERMITTENT INTERFERENCE and Ser. No. 11/611,718 entitled METHOD AND SYSTEM FOR RELIABLE DETECTION AND AVOIDANCE OF PERIODIC INTERMITTENT INTERFERENCE, both concurrently filed herewith.

FIELD

This invention relates wireless communications, and more particularly to a method and system for reliably detecting and avoiding intermittent interference (PII) on wireless devices.

BACKGROUND

End users of voice over WiFi systems may experience poor audio quality or even a dropped call when using a handheld device that is unable to receive and decode voice and control packets on a noisy channel. For example, the periodic intermittent interference (PII) emitted by microwave ovens may disrupt or impair communications between an access point and a handheld device implemented according to the IEEE 802.11 standard (and operating in the 2.4 GHz band) and the access point with which it is associated to obtain network connectivity. Household microwave ovens use a magnetron tube that generally operates with about a 50% duty cycle over 16.67 ms (1/60 Hz) periods in North America (20 ms, 1/50 Hz in the rest of the world). In other words, the timing characteristics of the emitted energy can generally be described as a square wave, cycling on for about 8.33 ms, then off for about 8.33 ms (on/off for about 10 ms in the rest of the world). A means of avoiding on-channel interference from other devices is desired to improve the audio quality experience of the end users who own and operate voice over WiFi services.

Consider a Voice over WLAN (VoWLAN) handset using the access methods defined by IEEE 802.11. The access methods utilize a collision sensing mechanism referred to as the clear channel assessment (CCA) algorithm that senses the energy level on the channel. Since this algorithm is used to defer channel access while energy is above some threshold, the existing scheme may already seem well-suited to sensing microwave interference. Detection performance can, however, still suffer in certain scenarios. A major shortfall of this scheme is when the interference level is below the CCA threshold (particularly at one end of the link) but still high enough to result in a low C/I, and hence lost or corrupted packets, at one or both ends of the link.

With 802.11a/g, the CCA threshold is −62 dBm for an invalid Orthogonal Frequency Division Multiplexing (OFDM) frame, 20 dB higher than that for a valid frame, so this scenario is much more likely to occur with periodic intermittent interference (PII) than with another 11a/g device. When this scenario occurs, the CCA algorithm signals that the channel is clear and frame deliveries (both payload and any subsequent acknowledgements (ACKs)) are attempted while interference is present. The result is that initial delivery attempts are not likely to be successful. Retransmissions can occur based on the 802.11 distributed coordination function (DCF) mechanism which specifies exponentially longer maximum back-off lengths. However, since these are maximum lengths, there is the possibility that all retransmissions are attempted during a PII on-cycle. When this occurs, the frame is dropped. For VoWLAN applications, retransmissions are usually initiated at the MAC layer, and are usually limited to 6 retransmissions or so. The back-off periods between retransmissions are randomly drawn between zero and the contention window lengths that are specified for each retry in the standard. Taking into account the IEEE 802.11 Distributed Coordination Function, the cumulative back-off time is uniformly distributed between 0.238 ms and 27.5 ms for an initial delivery attempt followed by up to 6 retransmissions. So if a microwave oven is not detected (by the CCA algorithm), and an initial packet delivery attempt occurs during the magnetron tube's on-cycle, all retransmission attempts can occur (and fail) before the on-cycle ends.

Even when the CCA algorithm is successful at detecting PII on the channel, the channel may be sensed as being clear during a brief absence of PII only to have the interference return and corrupt the subsequent transmissions (data and/or ACKs) that are initiated. This is especially an issue for rapidly varying PII (relative to frame lengths).

Several published patent applications propose various means for avoiding transmitting on those frequencies/channels where intermittent interference is detected. None of these publications teach how to implement a detection mechanism, but a common theme is that each relies on knowledge of electromagnetic characteristics of the PII such as on/off timing and center-frequency. Even if detection is successful, some PII sources (such as certain microwave ovens) emit interference with significant spectral content across all WLAN channels. In this case there is no "clear" channel available to select.

SUMMARY

Embodiments in accordance with the present invention can provide a means of augmenting the existing CCA or proposing a new sensing mechanism with greater intelligence and flexibility in the presence of PII by adding adaptive and predictive functionality to a channel sensing mechanism. The result is a channel assessment algorithm that makes channel indications based not only on current conditions, but also on recent PII characteristics.

In a first embodiment of the present invention, a method of predictive sensing of periodic intermittent interference (PII) can include the steps of determining if a channel is currently in a PII on-cycle, adjusting a clear channel assessment threshold to a new threshold for improved sensitivity of the PII on-cycle when the PII on-cycle is determined, determining if a current energy level on the channel is below the new threshold and if a previous on-energy characteristic suggests that the current energy level will remain below the new threshold for a predetermined minimum period of time, and providing a clear channel indication if the current energy level is below the new threshold and the previous on-energy characteristic suggests the predetermined minimum period of time. The method can further include the step of using a standard Clear Channel Assessment (CCA) when the channel is not in the PII on-cycle to provide either a busy channel indication or a clear channel indication. The method can also include the step of measuring energy on a channel for an indication of PII. When either the current energy level is above the new threshold or the previous on-energy characteristic suggests the current energy level will not remain below the threshold for predetermined minimum period of time, the method can provide a busy channel indication. The method can further store recent energy measurements in a buffer. When detecting PII on the channel, the method can also extract PII timing characteristics. Note, the step of adjusting the clear channel assessment threshold can include the step of lowering the Clear Channel Assessment (CCA) busy channel threshold to a predetermined threshold (such as −82 dBm corresponding to valid OFDM frame) or alternatively adjusting the Clear Channel Assessment (CCA) busy channel threshold adaptively based on recent channel energy measurement statistics. Further note, the previous on-energy characteristic can be the channel energy measurements during one or more previous on-cycles.

In a second embodiment of the present invention, a system of predictive sensing of periodic intermittent interference (PII) can include a transceiver and a processor coupled to the transceiver. The processor can be programmed to determine if a channel is currently in a PII on-cycle, adjust a clear channel assessment threshold to a new threshold for improved sensitivity of the PII on-cycle when the PII on-cycle is determined, determine if a current energy level on the channel is below the new threshold and if a previous on-energy characteristic suggests that the current energy level will remain below the new threshold for a predetermined minimum period of time, and provide a clear channel indication if the current energy level is below the new threshold and the previous on-energy characteristic suggests the predetermined minimum period of time. The processor can be further programmed to use a standard Clear Channel Assessment (CCA) when the channel is not in the PII on-cycle to provide either a busy channel indication or a clear channel indication. The processor can also be programmed to provide a busy channel indication when either the current energy level is above the new threshold or the previous on-energy characteristic suggests the current energy level will not remain below the threshold for predetermined minimum period of time. The processor can also extract PII timing characteristics when detecting PII on the channel. The processor can further adjust the clear channel assessment threshold by lowering the Clear Channel Assessment (CCA) busy channel threshold to a predetermined threshold or adjust the clear channel assessment threshold by adjusting the Clear Channel Assessment (CCA) busy channel threshold adaptively based on recent channel energy measurement statistics. The processor can further be programmed to determine if the previous on-energy characteristic suggest that the current energy level will remain below the new threshold for the predetermined minimum period of time by comparing the channel energy measurements during one or more previous on-cycles with the current energy level. The system can be an access point in a WLAN or WiMAX or WiFi communication system.

In a third embodiment of the present invention, a system of predictive sensing of periodic intermittent interference (PII) can include a transceiver, a PII detector coupled to the transceiver, and a processor coupled to the transceiver and the PII detector. The processor can be programmed to monitor for PII on a current channel, determine if a channel is currently in a PII on-cycle, adjust a clear channel assessment threshold to a new threshold for improved sensitivity of the PII on-cycle when the PII on-cycle is determined, determine if a current energy level on the channel is below the new threshold and if a previous on-energy characteristic suggests that the current energy level will remain below the new threshold for a predetermined minimum period of time, and provide a clear channel indication if the current energy level is below the new threshold and the previous on-energy characteristic suggests the predetermined minimum period of time. The processor can be further programmed to provide a busy channel indication when either the current energy level is above the new threshold or the previous on-energy characteristic suggests the current energy level will not remain below the threshold for predetermined minimum period of time.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a midlet, a source code, an object code, a shared library/dynamic load library and/or other sequence of instructions designed for execution on a computer system. The "processor" as described herein can be any suitable component or combination of components, including any suitable hardware or software, that are capable of executing the processes described in relation to the inventive arrangements.

Other embodiments, when configured in accordance with the inventive arrangements disclosed herein, can include a system for performing and a machine readable storage for causing a machine to perform the various processes and methods disclosed herein.

DETAILED DESCRIPTION OF THE DRAWINGS

Figure 1:
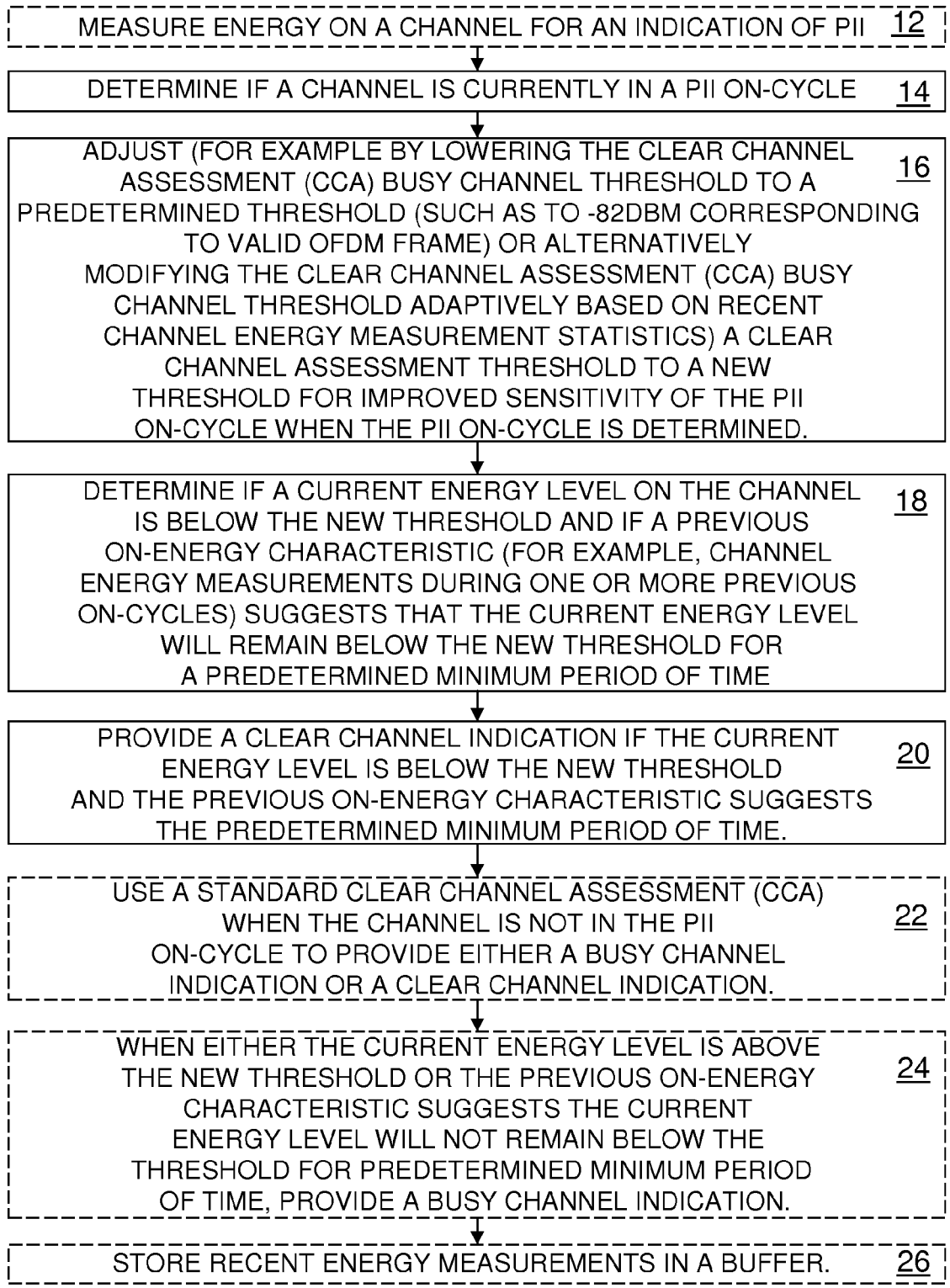
FIG. 1 is a flow chart of a method of detecting and avoiding PII in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

The embodiments herein can provide an improved CCA implementation (or a new channel assessment algorithm) that allows WLAN, WiFi, or WiMAX devices to detect certain types of commonly encountered PII, such as microwave ovens. Once PII is detected and its timing is determined (via any number of PII detection schemes) the methods and systems herein can modify a CCA threshold (or other relevant threshold) based on recent channel energy measurements that can be stored in a buffer. The threshold is generally lowered to provide more sensitivity to PII based on the average and peak energy levels during the recently identified PII on-cycles. The CCA can also be modified to only provide clear-channel indications when periods of PII on-cycles are below the new threshold for a (fixed or adaptively determined) minimum duration, based on previous PII behavior.

Referring to FIG. 1, a flow chart illustrating a method 10 of predictive sensing of periodic intermittent interference (PII) can include the steps of measuring energy on a channel for an indication of PII at step 12, determining if a channel is currently in a PII on-cycle at step 14 and adjusting a clear channel assessment threshold (for example by lowering the Clear Channel Assessment (CCA) busy channel threshold to a predetermined threshold (such as to −82 dBm corresponding to valid OFDM frame) or alternatively modifying the Clear Channel Assessment (CCA) busy channel threshold adaptively based on recent channel energy measurement statistics) at step 16 to a new threshold for improved sensitivity of the PII on-cycle when the PII on-cycle is determined. At step 18, the method 10 can determine if a current energy level on the channel is below the new threshold and if a previous on-energy characteristic (for example, channel energy measurements during one or more previous on-cycles) suggests that the current energy level will remain below the new threshold for a predetermined minimum period of time. The method can provide a clear channel indication if the current energy level is below the new threshold and the previous on-energy characteristic suggests the predetermined minimum period of time at step 20. At step 22, a standard Clear Channel Assessment (CCA) is used when the channel is not in the PII on-cycle to provide either a busy channel indication or a clear channel indication. At step 24, a busy channel indication is provided when either the current energy level is above the new threshold or the previous on-energy characteristic suggests the current energy level will not remain below the threshold for predetermined minimum period of time. The method can also optionally store recent energy measurements in a buffer at step 26. Although the method 10 is presented in a given order, please note that an order is not necessarily implied thereby and that additional steps or steps in different order are certainly contemplated to be within the scoped of the claimed invention.

Figure 2:
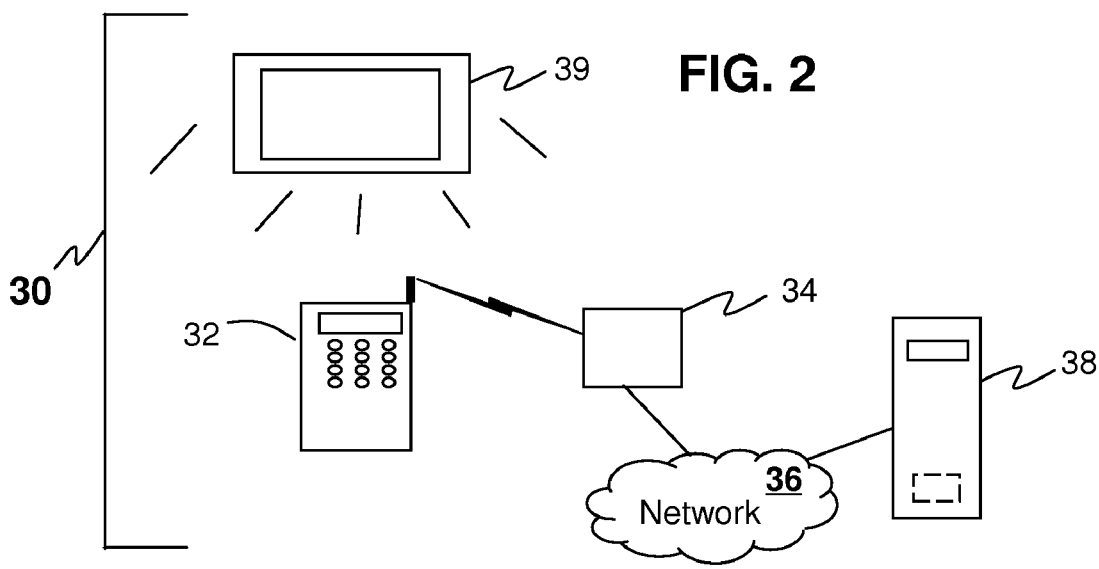
FIG. 2 is a block diagram illustrating a communication system subjected to PII in accordance with an embodiment of the present invention.

With reference to FIG. 2, a simple communication system 30 subjected to PII is illustrated. The system 30 can include a Wifi or WLAN or WiMAX radio transceiver unit or communication handset 32 operatively coupled to an access point (AP) 34. The access point 34 can be coupled to computer or server 38 via a communication network 36. The PII source 39 can be any number of device, but in most instances will likely be a microwave oven.

Figure 3:
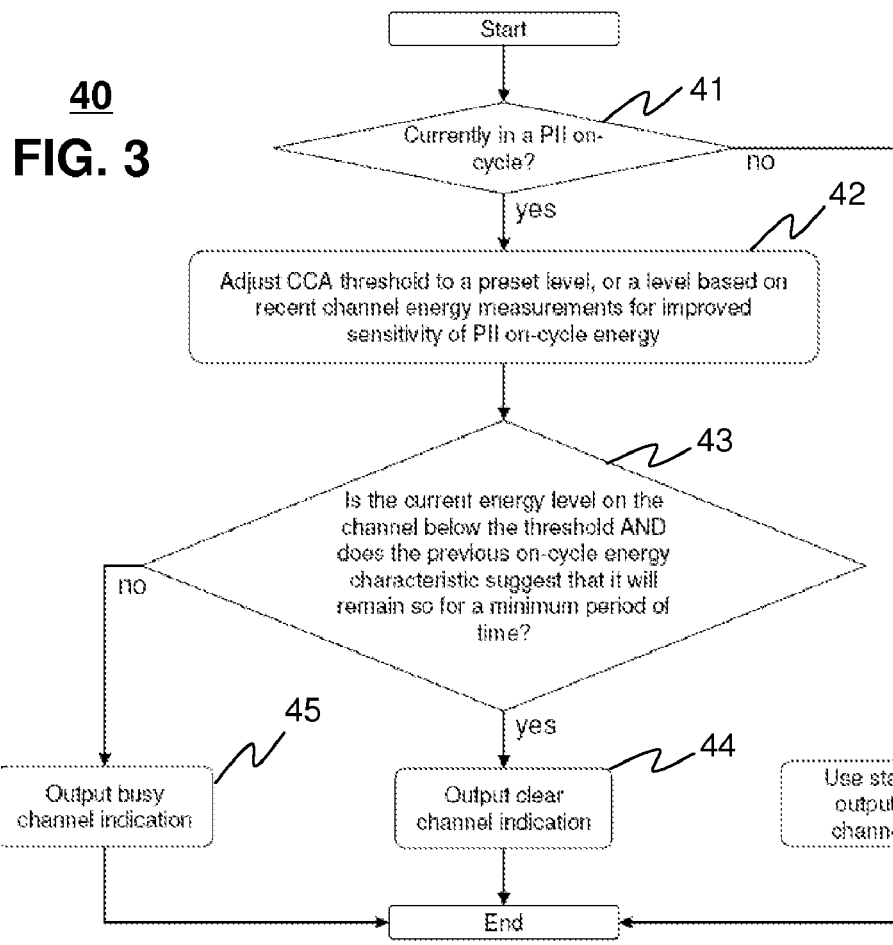
FIG. 3 is a flow chart illustrating another method of detecting and avoiding PII in accordance with an embodiment of the present invention.

Referring to FIG. 3, a flow chart illustrating another method 40 similar to method 10 of FIG. 1 of predictive sensing of periodic intermittent interference (PII) is shown. The algorithm described in the flowchart can be started each time a channel energy measurement is collected. If PII is detected on the channel and based on the PII timing characteristics extracted by a PII detector, it is determined that the interference is currently in a PII on-cycle at decision block 41, then a CCA busy-channel threshold is modified (lowered) to some predetermined level at step 42. (If no PII is detected or the measured energy is not in the PII on-cycle, then standard CCA busy/clear indication can be provided for those measurements at step 46). For example, the threshold can be lowered to a −82 dBm level that normally corresponds to a valid OFDM frame. In an alternate embodiment, the modified level for the threshold can be adaptively based on recent channel energy measurement statistics (e.g., peak measurements, 90th percentile, mean, etc.). The lowered busy-channel threshold allows for more reliable detection of the PII during on-cycles, which may be below the normal (−62 dBm for a non-valid OFDM frame) CCA threshold. At decision block 43, if the current channel energy is below the (lowered) threshold and the channel energy measurements during one or more of the previous on-cycles (16.67 ms ago for 60 Hz microwave interference or 8.33 ms ago for 120 Hz interference) are also below the threshold for some minimum period of time, then a clear channel indication is made at step 44. If the current energy measurements are either above the threshold or a previous energy characteristic suggests that the energy level will not remain below the threshold for a minimum period of time, then the method will output a busy channel indication at step 45.

This minimum time period can either be a fixed parameter, or adaptive based on the required transmission time for pending and/or recent traffic. It is recommended that for larger packets the fragmentation threshold be set small enough such that transmissions can be completed during short clear channel periods. This use of previous samples takes advantage of the periodicity of the PII and the similarity of the PII on-cycle characteristics (shape) from one on-cycle to the next (the characteristics can, however, change significantly over longer periods). With this approach, periods of low energy during on-cycles that are too brief to be of use are not indicated as clear-channel periods. This is especially useful for ovens with relatively rapid high/low energy variations during on-cycles.

Figure 4:
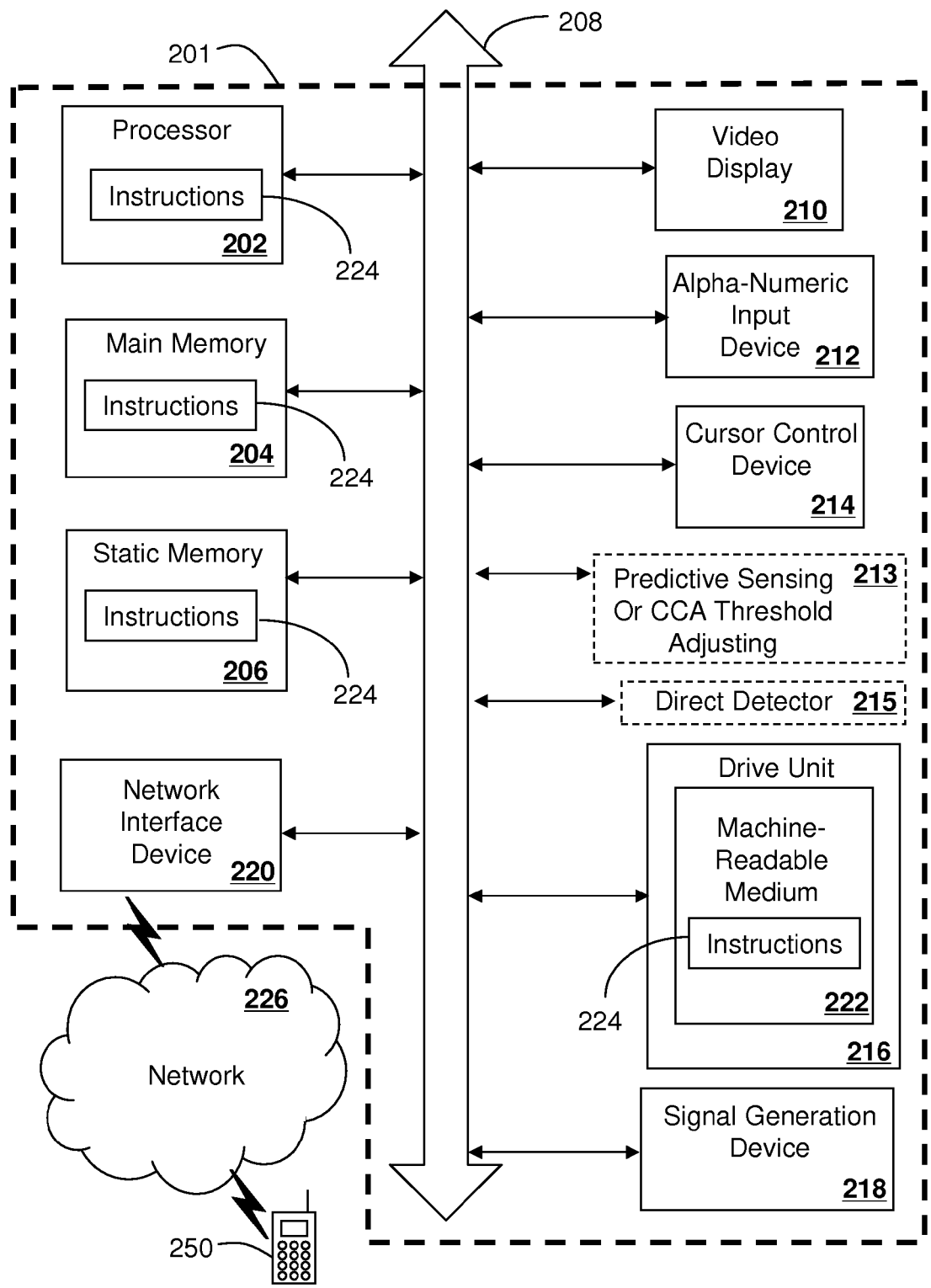
FIG. 4 is an illustration of a system for detecting and avoiding PII in accordance with an embodiment of the present invention.

FIG. 4 depicts an exemplary diagrammatic representation of a machine in the form of a computer system 200 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. For example, the computer system can include a recipient device 201 and a sending device 250 or vice-versa.

The machine may comprise a server computer, a client user computer, a personal computer (PC), a tablet PC, personal digital assistant, a cellular phone, a laptop computer, a desktop computer, a control system, a network router, switch or bridge, or any machine capable of executing a set of instructions (sequential or otherwise) that specify actions to be taken by that machine, not to mention a mobile server. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 200 can include a controller or processor 202 (e.g., a central processing unit (CPU), a graphics processing unit (GPU, or both), a main memory 204 and a static memory 206, which communicate with each other via a bus 208. The computer system 200 may further include a presentation device such as a video display unit 210 (e.g., a liquid crystal display (LCD), a flat panel, a solid state display, or a cathode ray tube (CRT)). The computer system 200 may include an input device 212 (e.g., a keyboard), a cursor control device 214 (e.g., a mouse), a disk drive unit 216, a signal generation device 218 (e.g., a speaker or remote control that can also serve as a presentation device) and a network interface device 220. The embodiments can also optionally include a module 213 for predictive sensing or for CCA threshold adjusting and a direct detector 215 which can be in hardware or software or any combination thereof. These functions can alternatively be done within the contemplated embodiments in the processor 202 which can be a DSP. Of course, in the embodiments disclosed, many of the items discussed are optional.

The disk drive unit 216 may include a machine-readable medium 222 on which is stored one or more sets of instructions (e.g., software 224) embodying any one or more of the methodologies or functions described herein, including those methods illustrated above. The instructions 224 may also reside, completely or at least partially, within the main memory 204, the static memory 206, and/or within the processor 202 during execution thereof by the computer system 200. The main memory 204 and the processor 202 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but are not limited to, distributed processing or component/object distributed processing, parallel processing, or virtual machine processing can also be constructed to implement the methods described herein. Further note, implementations can also include neural network implementations, and ad hoc or mesh network implementations between communication devices.

The present disclosure contemplates a machine readable medium containing instructions 224, or that which receives and executes instructions 224 from a propagated signal so that a device connected to a network environment 226 can send or receive voice, video or data, and to communicate over the network 226 using the instructions 224. The instructions 224 may further be transmitted or received over a network 226 via the network interface device 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein. Further note, the embodiments are not necessarily limited to song files, but can also include video files or multimedia files that can have a pace or tempo associated with such files.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method of predictive sensing of periodic intermittent interference (PII), comprising the steps of:
   determining if a channel is currently in a PII on-cycle;
   adjusting a clear channel assessment threshold to a new threshold for improved sensitivity of the PII on-cycle when the PII on-cycle is determined;
   determining if a current energy level on the channel is below the new threshold and if a previous on-energy characteristic suggests that the current energy level will remain below the new threshold for a predetermined minimum period of time; and
   providing a clear channel indication if the current energy level is below the new threshold and the previous on-energy characteristic suggests that the current energy level will remain below the new threshold for the predetermined minimum period of time.

2. The method of claim 1, wherein the method further comprises the step of using a standard Clear Channel Assessment (CCA) when the channel is not in the PII on-cycle to provide either a busy channel indication or a clear channel indication.

3. The method of claim 1, wherein the method further comprises the step of measuring energy on a channel for an indication of PII.

4. The method of claim 1, wherein the method further comprises the step of providing a busy channel indication when either the current energy level is above the new threshold or the previous on-energy characteristic suggests the current energy level will not remain below the threshold for predetermined minimum period of time.

5. The method of claim 1, wherein the method further comprises the step of storing recent energy measurements in a buffer.

6. The method of claim 1, wherein the method further comprises the step of detecting PII on the channel and extracting PII timing characteristics when detecting PII on the channel.

7. The method of claim 1, wherein the step of adjusting the clear channel assessment threshold comprises the step of lowering the Clear Channel Assessment (CCA) busy channel threshold to a predetermined threshold.

8. The method of claim 1, wherein the predetermined threshold is −82 dBm corresponding to valid OFDM frame.

9. The method of claim 1, wherein the step of adjusting the clear channel assessment threshold comprises the step of modifying the Clear Channel Assessment (CCA) busy channel threshold adaptively based on recent channel energy measurement statistics.

10. The method of claim 1, wherein the previous on-energy characteristic is the channel energy measurements during one or more previous on-cycles.

11. A system of predictive sensing of periodic intermittent interference (PII), comprising:
a transceiver; and
a processor coupled to the transceiver, wherein the processor is programmed to:
determine if a channel is currently in a PII on-cycle;
adjust a clear channel assessment threshold to a new threshold for improved sensitivity of the PII on-cycle when the PII on-cycle is determined;
determine if a current energy level on the channel is below the new threshold and if a previous on-energy characteristic suggests that the current energy level will remain below the new threshold for a predetermined minimum period of time; and
provide a clear channel indication if the current energy level is below the new threshold and the previous on-energy characteristic suggests that the current energy level will remain below the new threshold for the predetermined minimum period of time.

12. The system of claim 11, wherein the processor is further programmed to use a standard Clear Channel Assessment (CCA) when the channel is not in the PII on-cycle to provide either a busy channel indication or a clear channel indication.

13. The system of claim 11, wherein the processor is programmed to provide a busy channel indication when either the current energy level is above the new threshold or the previous on-energy characteristic suggests the current energy level will not remain below the threshold for predetermined minimum period of time.

14. The system of claim 11, wherein the processor is programmed to detect PII on the channel and extract PII timing characteristics when detecting PII on the channel.

15. The system of claim 11, wherein the processor is further programmed to adjust the clear channel assessment threshold by lowering the Clear Channel Assessment (CCA) busy channel threshold to a predetermined threshold.

16. The system of claim 11, wherein the processor is further programmed to adjust the clear channel assessment threshold by modifying the Clear Channel Assessment (CCA) busy channel threshold adaptively based on recent channel energy measurement statistics.

17. The system of claim 11, wherein the processor is further programmed to determine if the previous on-energy characteristic suggest that the current energy level will remain below the new threshold for the predetermined minimum period of time by comparing the channel energy measurements during one or more previous on-cycles with the current energy level.

18. The system of claim 11, wherein the system is an access point in a WLAN or WiMAX or WiFi communication system.

19. A system of predictive sensing of periodic intermittent interference (PII), comprising:
a transceiver;
a PII detector coupled to the transceiver; and
a processor coupled to the transceiver and the PII detector, wherein the processor is programmed to:
monitor for PII on a current channel; and
determine if a channel is currently in a PII on-cycle;
adjust a clear channel assessment threshold to a new threshold for improved sensitivity of the PII on-cycle when the PII on-cycle is determined;
determine if a current energy level on the channel is below the new threshold and if a previous on-energy characteristic suggests that the current energy level will remain below the new threshold for a predetermined minimum period of time; and
provide a clear channel indication if the current energy level is below the new threshold and the previous on-energy characteristic suggests that the current energy level will remain below the new threshold for the predetermined minimum period of time.

20. The system of claim 19, wherein the processor is programmed to provide a busy channel indication when either the current energy level is above the new threshold or the previous on-energy characteristic suggests the current energy level will not remain below the threshold for predetermined minimum period of time.

* * * * *